Figure 1:
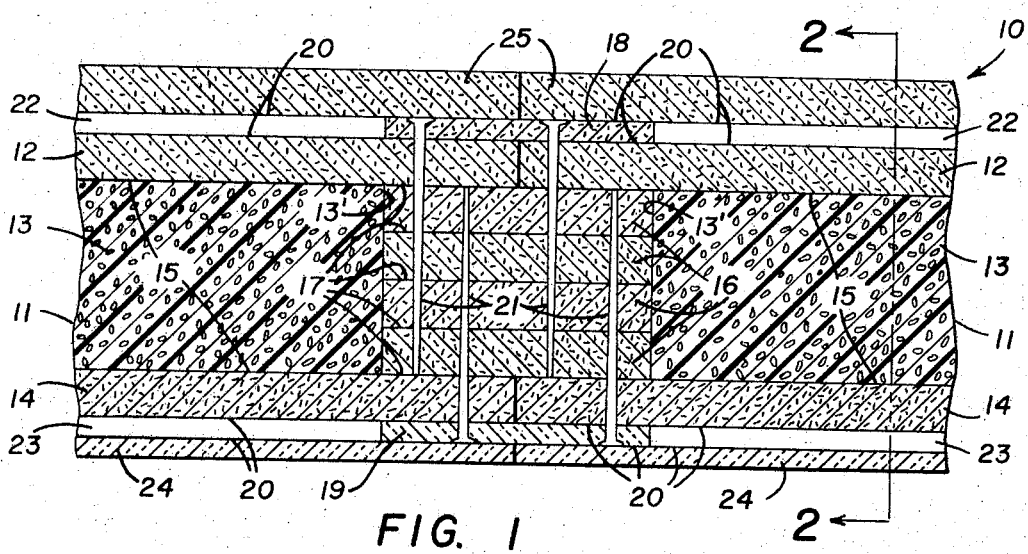

INVENTOR.
B. F. RAYNES

United States Patent Office 3,336,710
Patented Aug. 22, 1967

3,336,710
FIRE RESISTANT WALL PANEL
Burt F. Raynes, Chula Vista, Calif., assignor to Rohr Corporation, Chula Vista, Calif., a corporation of California
Filed Sept. 24, 1965, Ser. No. 489,922
7 Claims. (Cl. 52—309)

This invention relates to panel wall construction in general and more particularly to a continuous unitary fire resistant panel wall capable of being pre-fabricated prior to erection on the building site.

Prior art methods are capable of producing pre-fabricated fire resistant panel walls, but these walls are limited to widths of the order of only four feet. The prior art walls incorporate fire resistant materials, such as gypsum, which per se is not recognized as a shear resistant structural material. This inability of prior art fire resistant materials and walls to withstand shear loads has required the use of intermediate steel stiffeners or insert structures in order to enable the walls to withstand shear loads.

Some building codes prohibit the use of gypsum for the purpose of resisting shear loads. In order to overcome this limiting factor of gypsum and other fire resistant materials as to its resistance to shear loads, yet still maintain its fire resistant advantage, a gypsum and cement-asbestos board composite panel wall capable of offering shear resistance is used in the present invention. As otherwise expressed, the present invention also envisions a multi-layer or laminar wall comprising an inner layer of foam cored panels disposed end to end and each having facing sheets of gypsum board, and outer layers disposed on opposite sides of the inner layer and secured thereto in spaced relation therewith, the outer layers respectively comprising sheets of gypsum and asbestos-cement board disposed end to end.

This composite or laminar panel wall eliminates the need for any intermediate steel stiffeners or supports which necessarily require field construction and provides for pre-fabrication of a fire resistant panel wall of the order of twenty feet in width.

By placing at intermediate locations throughout the composite panel, a plurality of gypsum boards fastened together, a means of connecting adjoining wall panels is provided for the panel wall that previously was obtained only by the use of steel components.

The entire composite or multi-layer wall is factory fabricated and features in addition to the use of a plurality of short panels at the joint section to serve as a connecting means, a plurality of spacer panels to provide air spaces between the various wall layers.

An object of the present invention is to provide new and improved factory fabricated, fire resistant panel walls.

Another object is to provide a factory fabricated fire resistant panel wall capable of resisting shear loads.

Another object is to provide a completely factory fabricated fire resistant panel wall of the order of twenty feet in width.

Another object is to eliminate the need for any intermediate steel stiffeners or supports and their necessary field erection operations previously required of panel walls having widths greater than the order of four feet.

Figure 2:
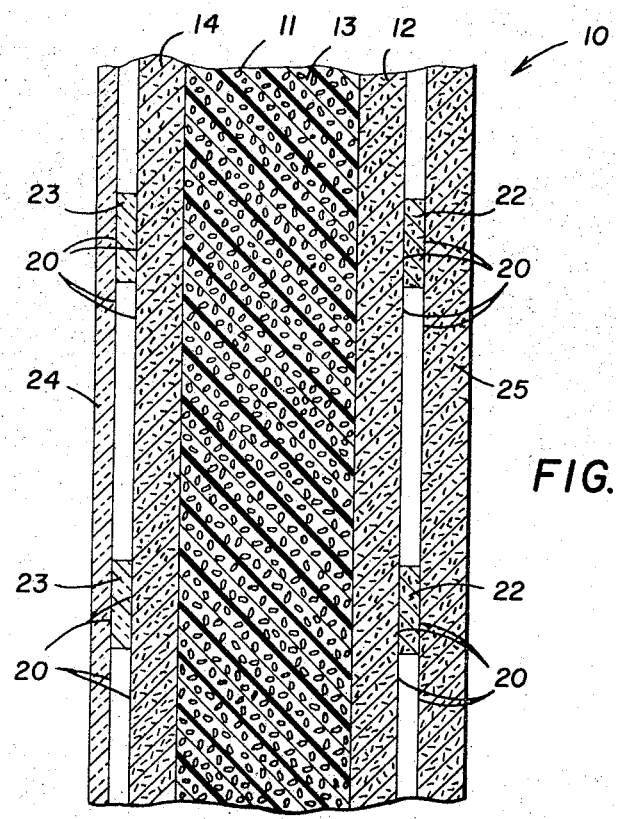

Still other objects, features and advantages of the present invention will become more clearly apparent as the description proceeds, reference being had to the accompanying drawings wherein:

FIG. 1 is a sectional view of the fire resistant composite panel wall taken through a joint section thereof and between horizontally disposed spacer panels; and FIG. 2 is a sectional view taken along the line 2—2 of FIG. 1.

Describing the invention in detail, attention is directed to FIG. 1 wherein the reference numeral 10 designates the composite panel wall.

The panel wall 10 is fabricated by first positioning together end to end pre-bonded 3 inch thick interior wall sandwich panels 11 which are comprised of two ½ inch gypsum wall board faces 12 and 14 and an interior core section of polystyrene foam 13. This 3 inch interior wall panel 11 is commercially available in 4 foot widths. The gypsum wall board in this instance and as employed throughout the invention is the common variety paper backed type commercially available material. The polystyrene foam 13 is bonded as at 15 to the gypsum boards 12 and 14 by an adhesive, not shown, that is applied between the respective surfaces thereof.

At the joint section where the wall panels 11 join one another, a portion of the interior section polystyrene foam 13 is removed to form a recess 13'. In this recess are placed four ½ inch by 3 inch gypsum connecting panels 16 which run the entire height of the composite panel wall 10. These gypsum connecting panels 16 are bonded as at 17 to each other and to the gypsum boards 12 and 14 of the 3 inch interior wall panels 11 by an adhesive, not shown, which is applied between the surfaces of the panels 16 and those surfaces of the boards 12 and 14 which come in contact with the said panels.

A 3/16 inch by 3 inch gypsum spacer panel 18 which runs the entire height of the composite panel wall 10, is then placed on one side of the joint section and a 3/16 inch by 3 inch asbestos-cement spacer board 19 is placed on the other side of the joint section of the interior wall 11 in overlapping relation to the abutting face sheets 12 and 14. Alternatively, when desired or required, an asbestos-cement spacer panel may be substituted for the gypsum spacer panel 18. The gypsum panel 18 and asbestos-cement panel 19 are bonded as at 20 to the gypsum boards 12 and 14 by an epoxy resin, not shown, which is applied between the respective mating surfaces.

Countersunk type nails 21 are then driven from both sides of the joint section through spacer panel 18 and spacer board 19, the gypsum boards 12 and 14 and the gypsum connecting panels 16. The nails 21 are driven through the gypsum panel 18 do not extend into the gypsum panel 14, and the nails 21 driven through the asbestos-cement board 19 do not extend into the gypsum panel 12. The primary function of the nails 21 is to prevent the walls from collapsing in the event of fire. Under high temperature conditions created by fire the various glues and resins loose their holding ability. This loss of holding ability would result in the collapse of the wall and substantial damage if the nails 21 were not also used.

After the nails 21 have been driven in place, 3/16 inch by 1 inch gypsum panels 22 are positioned horizontally and spaced vertically on 8 inch centers, as shown in FIG. 2, on one side of the standard interior wall panels 11 thereby leaving intermittent air spaces therebetween. These 3/16 inch by 1 inch gypsum spacer panels 22 are bonded as at 20 to the gypsum boards 12 using an epoxy resin, not shown, applied between the respective mating surfaces.

On the other side of the standard interior wall panels 11, 3/16 inch by 1 inch asbestos-cement spacer boards 23, are also positioned horizontally and spaced vertically on 8 inch centers which leave intermittent air spaces therebetween. These asbestos-cement board spacers 23 are then bonded as at 20 to the gypsum boards 14 using an epoxy resin, not shown, applied between the respective mating surfaces.

After the asbestos-cement board spacers 23 are secured in place, 3/16 inch asbestos-cement boards 24, as shown now in FIG. 1, with an exterior decorative finish are bonded as at 20 to both of the previously attached asbestos-cement spacer boards 19 and 23 using an epoxy resin, not shown. On the opposite side of the standard interior wall 11, ½ inch gypsum panels 25 with an interior decorative finish are bonded as at 20 to both of the previously attached gypsum spacer panels 18 and 22 using an epoxy resin, not shown.

The entire composite panel wall 10 is then positioned in a suitable holding fixture and the adhesives and the epoxy resin area allowed to cure and set at room temperature.

By providing asbestos-cement panels 19, 23 and 24 as part of the composite panel wall 10, the entire wall is now able to withstand the shear loads that will be experienced and still provide fire resistance. The main function of the ½ inch by 3 inch full height gypsum panels 16 which are bonded together is to provide a means for connecting adjoining wall panels.

By using both the asbestos-cement panels 19, 23 and 24 and the glued gypsum panels 16, a fire resistant panel wall 10 of the order of twenty feet in width, capable of withstanding shear loads can be fabricated. This panel wall 10 also eliminates the need for any intermediate steel stiffeners or supports and its necessary attendant problems of field erection.

The elimination of these costly intermediate steel stiffeners and supports also make it possible to completely pre-fabricate a fire resistant panel wall 10 in a factory, of the order of twenty feet in width, that was previously limited by prior art methods to panel walls of the order of only four feet in width.

From the foregoing it will now be apparent that a novel and unique fire resistant panel wall has been provided which is well adapted to fulfill the aforestated objects of the invention. While various alternative embodiments which fall within the scope of the present invention may suggest themselves to those skilled in the art, it is intended in the appended claims to cover all such additional embodiments, constructions and variations which fall within the spirit and scope of the invention.

Having thus described the invention, what is claimed as new and useful and what is desired to be secured by Letters Patent is:

1. A factory fabricated fire resistant laminar panel wall capable of withstanding shear loads, comprising the combination of a pair of interior wall panels each having a core and facing sheets and joined end to end with portions of their confronting core sections removed to form a recess therebetween, a plurality of fire resistant connecting panels positioned within said recess of the interior wall panels and fastened to each other and to the adjoining face sheets of the panels, a vertically disposed fire resistant spacer panel fastened to and overlapping said adjoining face sheets on one side of the interior wall panels, a plurality of horizontally disposed fire resistant spacer panels disposed at vertically spaced intervals along the interior wall panels and attached thereto on said one side thereof, a pair of fire resistant panels joined end to end at the joint of the interioir wall panels and fastened to said spacer panels, a vertically disposed combination fire and shear resistant spacer panel fastened to and overlapping the adjoining face sheets on the opposite side of the interior wall panels, a plurality of horizontally disposed combination fire and shear resistant spacer panels disposed at vertically spaced intervals along said opposite side of the interior panels and attached thereto, and a pair of combination fire and shear resistant panels joined end to end at the joint of the interior wall panels and fastened to said last named vertically and horizontally disposed spacer panels.

2. A factory fabricated laminar panel wall comprising an inner layer of a plurality of foam cored panels disposed in an end to end relationship throughout the length of the wall, a plurality of outer layer panels disposed on opposite sides of said inner layer of the wall and disposed end to end throughout the length of the wall, a plurality of spacer panels disposed between the outer layer panels and inner layer panels and secured thereto, adjoining ends of said inner layer panels forming recesses therebetween, and a plurality of connecting panels respectively positioned within said recesses and secured respectively to the adjoining inner layer panels individual thereto.

3. A laminar panel wall as in claim 1 wherein the connecting panels are gypsum panels, the cored interior panels have a core section of polystyrene foam and gypsum face sheets, the fire resistant spacer panels and outer layer panels are gypsum and the combination fire and shear resistant spacer panels and outer layer panels are asbestos-cement board.

4. A laminar panel wall as in claim 1 wherein the connecting panels are bonded face to face to one another and to the face sheets of the interior wall panels, and the spacer panels and outer layer panels are bonded to each other and to the interior wall panels.

5. A laminar panel wall as in claim 1 wherein nails are driven through the aligned overlapping spacer panels, the adjoining face sheets, and said connecting panels in order to provide support for the laminar panel wall and to secure said connecting and spacer panels at high temperatures.

6. A factory fabricated laminar panel wall as in claim 2 wherein a pair of said spacer panels are disposed vertically in overlapping relation to the joint between each pair of adjoining inner layer panels.

7. A factory fabricated laminar panel wall as in claim 6 wherein the remaining spacer panels are horizontally disposed in vertically spaced and extended between spaced pairs of said vertically disposed spacer panels.

References Cited

UNITED STATES PATENTS

| | | | |
|---|---|---|---|
| 1,372,478 | 3/1921 | Bradley | 161—69 X |
| 1,578,344 | 3/1926 | Munroe | 52—593 |
| 2,332,081 | 10/1943 | Hunt et al. | 52—586 |
| 2,787,345 | 4/1957 | Soubier et al. | 52—612 X |
| 2,797,573 | 7/1957 | Hummer | 52—417 X |
| 2,884,779 | 5/1959 | Buergin et al. | 52—612 X |
| 3,074,123 | 1/1963 | Gartrell | 52—586 |
| 3,196,491 | 7/1965 | Hartman et al. | 52—615 X |
| 3,305,986 | 2/1967 | Mathews | 52—309 X |

FRANK L. ABBOTT, *Primary Examiner.*

A. C. PERHAM, *Assistant Examiner.*